Sept. 22, 1936.   W. R. ANDERSON   2,054,918
COMBINATION WOOD BARREL MANUFACTURING MACHINE
Filed Dec. 12, 1933   4 Sheets-Sheet 1

INVENTOR
WILLIAM R. ANDERSON
BY
ATTORNEY

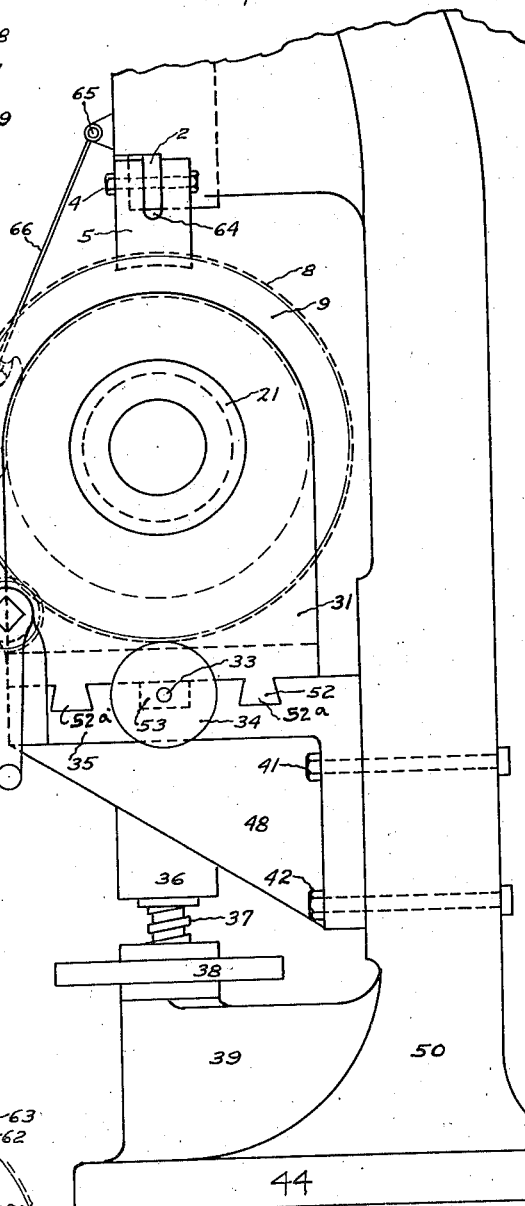

Sept. 22, 1936.  W. R. ANDERSON  2,054,918
COMBINATION WOOD BARREL MANUFACTURING MACHINE
Filed Dec. 12, 1933  4 Sheets-Sheet 3

INVENTOR.
WILLIAM R. ANDERSON.
BY Joseph Farley
ATTORNEY

Sept. 22, 1936.   W. R. ANDERSON   2,054,918
COMBINATION WOOD BARREL MANUFACTURING MACHINE
Filed Dec. 12, 1933   4 Sheets-Sheet 4

INVENTOR
WILLIAM R. ANDERSON
BY Joseph Farley
ATTORNEY

Patented Sept. 22, 1936

2,054,918

UNITED STATES PATENT OFFICE 2,054,918

COMBINATION WOOD BARREL MANUFACTURING MACHINE

William Ralph Anderson, Jackson, Mich.

Application December 12, 1933, Serial No. 701,990

12 Claims. (Cl. 147—1)

This invention relates to the cooperage art and has for its principal object to provide in a unitary structure a machine capable of performing quickly and efficiently all of the operations necessary to produce a bilged wooden barrel or keg.

An object of the present invention is to provide a new and improved barrel manufacturing machine wherewith it is possible to bend and press one stave at a time directly into a barrel.

A further object is to provide a new and improved means of bending barrel staves.

Another object is to provide new and improved means for crozing the inside of a barrel to receive the barrel head.

A still further object is to provide new and improved means for forcing truss hoops over a barrel drum and tightening the staves into the drum.

Another object is to provide means for planing the exterior of the barrel.

A further object is to provide means in a barrel assembling machine whereby it is possible to manufacture barrels of different sizes in the one machine.

A still further object is to provide new and improved means for driving staves into proper position.

The above and other objects of the invention will appear more fully from the following more detailed description and by reference to the accompanying drawings forming a part hereof and wherein—

Fig. 2 is an end view of the machine shown in Fig. 1;

Fig. 3 is a detail end view of one of the hoop driving nuts used on the machine;

Fig. 4 is a detail side view of the nut shown in Fig. 3;

Fig. 5 is a detail end view showing the crozing knives and the manner of attaching them to the machine;

Fig. 6 is a detail fragmentary view showing the parts for effecting a driving connection for the truss hoops;

Figure 1:
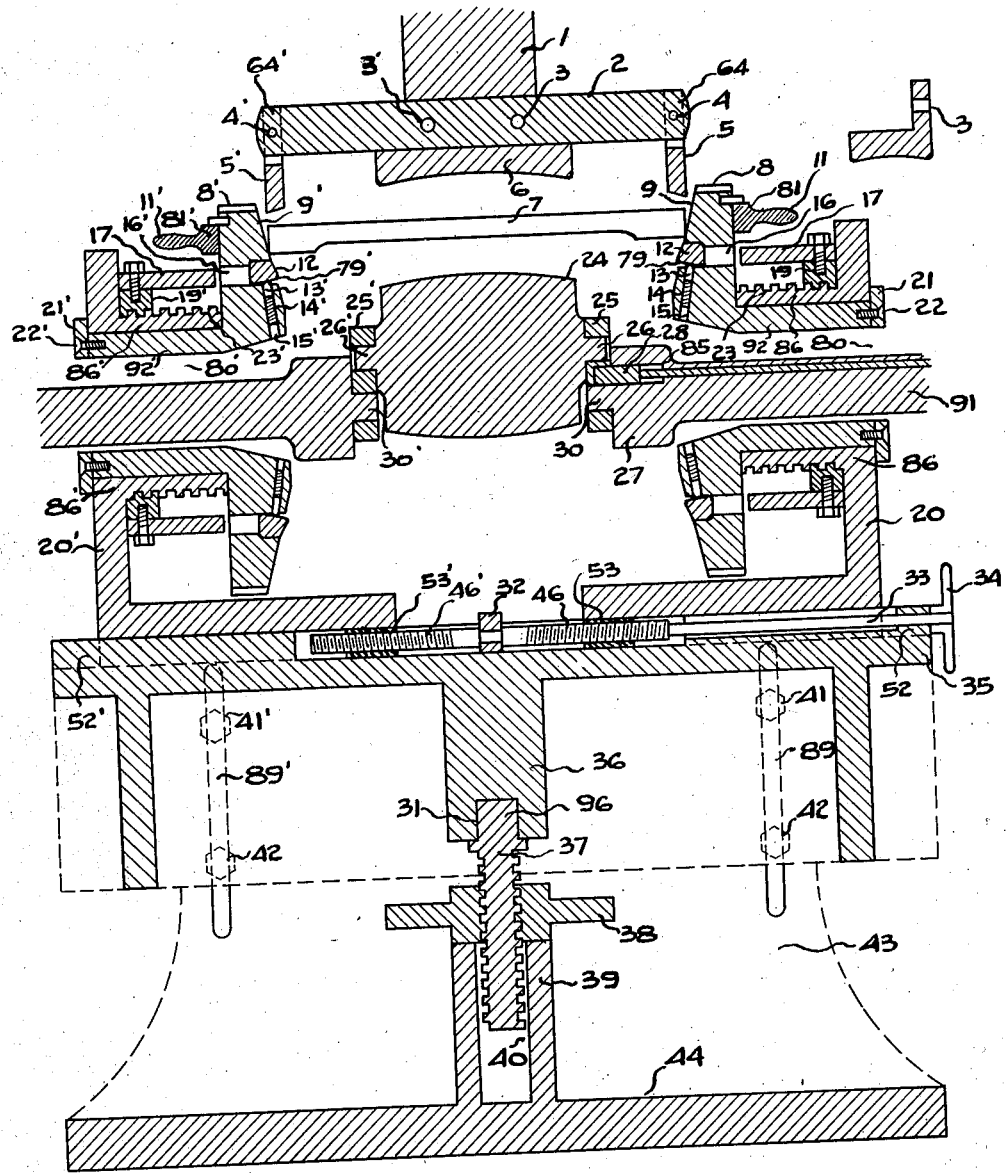
Fig. 1 is a central vertical section partially broken away through the main operating parts of the machine.

Referring now to the drawings: Reference character 44 (Fig. 2) designates a base of an ordinary punch press with which is integrally united a standard 50. Adjustably secured for vertical movement to the standard 50 is a table 35, the same being bolted to the standard by means of bolts 41, 41', 42, which pass through longitudinal slots 89, 89', in said table (Fig. 1). To facilitate the raising or lowering of the table, there is provided an elevating screw 37 with which is engaged a threaded hand wheel 38. The upper portion of elevating screw 37 is reduced and seats within a suitable recess provided in a lug 36 formed integrally with the table 35 and depending downwardly from said table.

Slidably mounted upon the table 35 is a pair of bearing brackets 20, 20' which are supported in guideways 52A, 52A' (Fig. 2), said brackets being provided with guides 52 fitting within said guideways. The table brackets may be adjustably moved towards and from each other by means of an adjusting screw 33 held in position by a bearing 32 formed on table 35 and said screw 33 engages with nuts 53, 53', formed integrally with the brackets 20, 20', respectively. The threads of the nuts 53, 53', and of the screw with which they engage are of opposite hands and a hand wheel 34 is secured to the adjusting screw so that when the hand wheel 34 is manipulated the table brackets will be moved in unison toward or away from each other as desired.

Rotatably mounted in the bearing brackets 20, 20' are a pair of face plates 9, 9' having integral therewith the hollow shafts 92, 92', which project into said brackets. Mounted upon the exterior of said shafts 92, 92' are a pair of hollow shafts 86, 86' having exterior screw threads 23, 23'. Each shaft 86, 86' has threaded on it an annular nut 19, 19', respectively, each nut being provided with a plurality of laterally extending truss hoop driving arms 17, said arms being secured to their respective nuts by bolts 18. Retaining rings 21, 21' are secured to shafts 92, 92' by means of screws 22, 22' and serve to prevent longitudinal movement of the shafts 86, 86'.

Figure 7:
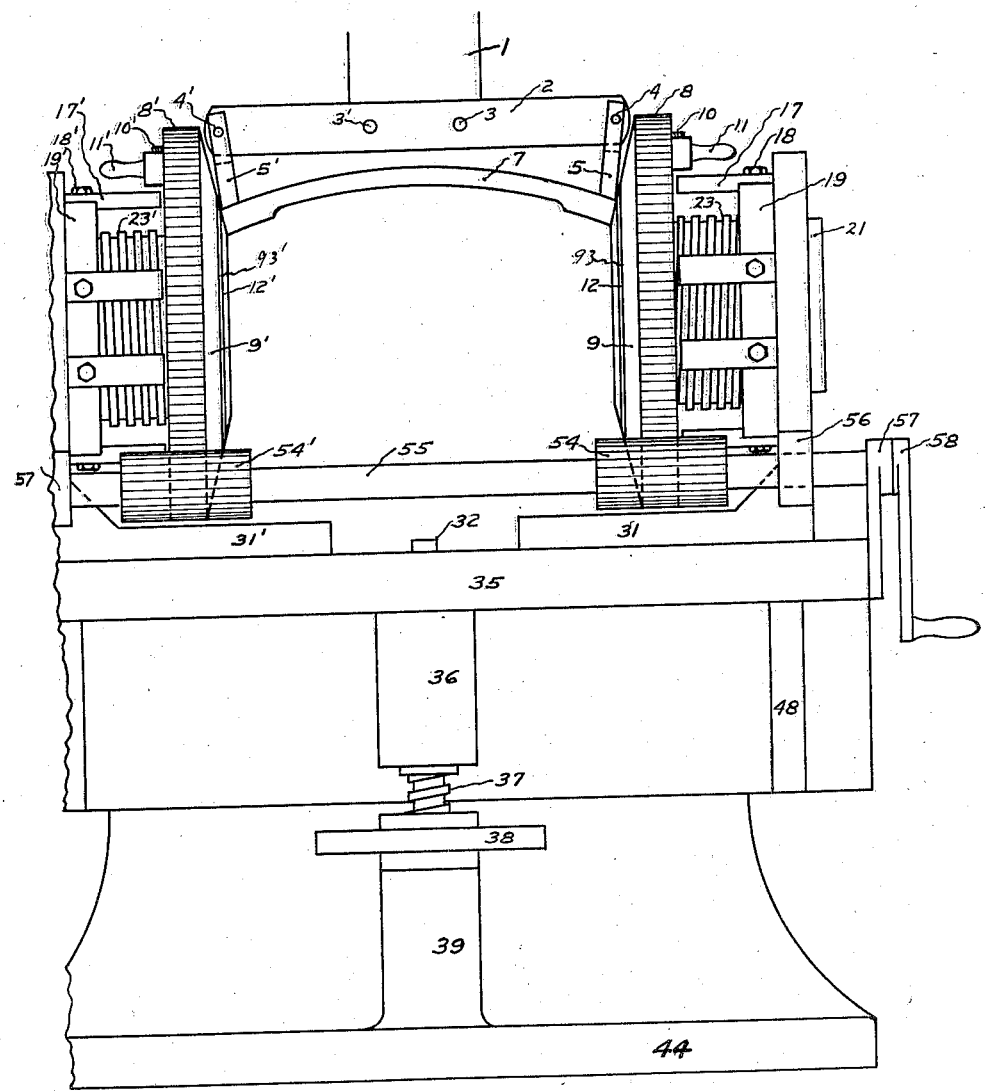
Fig. 7 is a front elevation of my machine partly broken away.

Rotation of the face plates 9, 9' is effected through gears 8, 8' which mesh with pinion gears 54, 54' keyed on shaft 55, journalled in bearings 57, 57'. A hand lever 58 is secured upon the end of shaft 55 for rotating the pinion gears 54, 54', gears 8, 8' and face plates 9, 9'. Pinion gears 54, 54' are of sufficient length, as shown best in Fig. 7 of the drawings, that when the bearing brackets 20, 20' are moved away from or toward each other, the meshing engagement of the gears 8, 8' with said pinions will be maintained. Mounted in annular grooves 93, 93' formed in the bevelled side of the respective face plates 9, 9' are a pair of truss hoops 12, 12', said hoops being retained within said grooves by pins 13, 13', pressed outwardly into engagement with the truss hoops by springs 14, 14' which abut at their inner end against stop pins 15, 15'.

Suitably secured by bolts 3, 3' to the ram 1 of the punch press is a cross arm 2 to the end of which is pivotally supported by means of bolts 4, 4' a pair of stave bending pressure arms 5, 5'. When a stave is placed in position and the press is actuated to cause the ram to descend, the arms 5, 5' will engage the stave at its ends, forcing the stave ends downwardly onto the tapered front faces of the face plates 9, 9'. The forcing of the ends of the stave downwardly onto the tapered faces of the face plates causes pressure to be exerted inwardly on the stave ends in a direction substantially longitudinally of its stave and causes the stave to bow upwardly at the center into the desired curvature for producing a bilged barrel. After a stave has been bent another stave is inserted, the ram again descends and the operation is repeated until enough staves are inserted between the face plates to form a complete barrel, the bent staves being held in position during the bending of a subsequent stave by engagement under the edges 79, 79' of the truss hoops 12, 12'.

After all of the staves have been bent into position, the punch press is operated to drive the staves into tight relationship, this being accomplished by the action of hammer 6 and anvil 24 which are provided with opposed curved surfaces to correspond to the bilged contour of the barrel, it being understood that during the hammering operation the stave bending pressure arms are removed.

Figure 8:
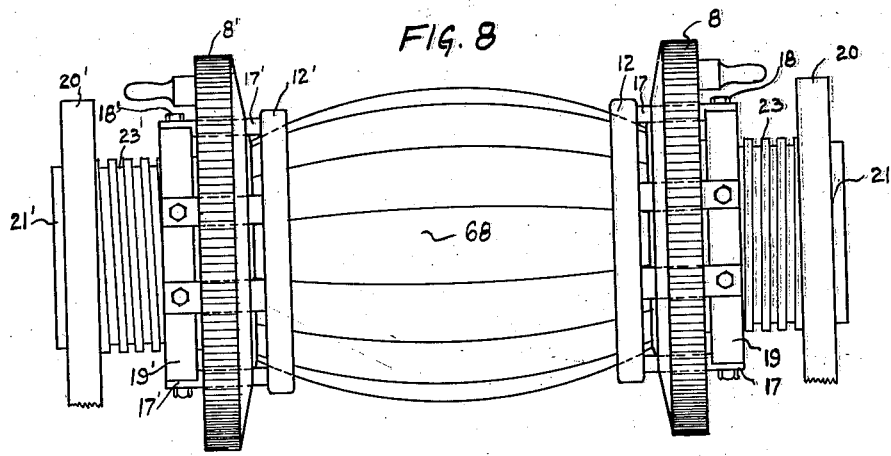
Fig. 8 is a front view of a portion of the machine showing a complete barrel drum after the truss hoops have been forced onto the drum.

After all of the staves have been driven into place, truss hoops 12, 12' are then forced over the ends of the assembled barrel drum to force the staves into tight sideways engagement. To accomplish this the threaded ring nuts 19, 19' are moved longitudinally upon their shafts 86, 86' to cause the truss hoop arms 17 to pass through suitable slots formed in the face plates 9, 9' and into contact with the rear faces of the truss hoops 12. The nuts 19, 19' are actuated by connecting the face plates 9, 9' to one of the truss hoop arms 17 by means of a latch 81 see Fig. 6 pivoted on a bolt 61 screwed into the face plates. A spring 62 tends to hold the latch 81 normally against stop pin 10, and out of engagement with arm 17. A hand grip 11 secured to the latch 81 serves to permit it to be moved manually to bring its hooked end 82 into engagement with an arm 17 thus locking the arm and ring nuts 19, 19' to the face plates 9, 9'. Rotation of the turning crank 58 will then cause the rings 19, 19' to be rotated through the shaft 55, pinions 54, 54' and gears 8, 8'. Due to the rotation of the ring nuts relatively to the screws 23, 23', they will be moved longitudinally of said screws to cause the truss hoop arms 17 to force the truss hoops over the assembled and bent staves as shown in Fig. 8.

If it is found that the truss hoops do not draw the staves sufficiently close together, a hammering action by the hammer 6 heretofore described, may be resorted to in which case the anvil 24 shaped to correspond to the shape of the inside of the barrel drum, and trunnioned, as at 26, in bearings 25, 25', is brought into operative position by rotation of said bearings 25, 25' on studs 30, 30' projecting from the ends of the shafts 91, 91'. In order to hold the anvil 24 in operative position, a lock wedge 28 (Fig. 9) is provided attached to a draw bar which passes through an opening in shaft 91 and terminates in hand grip 84. Lock wedge 28 is held in locked position by means of a pin 74, which is adapted to engage a notch 100 in said draw bar and which is kept normally pressed against the draw bar by a spring 75, said pin having a handle 76 for releasing it. An additional locking means is provided in the form of a locking pin 94 adapted to engage a recess 95 in shaft 91 to prevent rotation of said shaft. When both of the above named locking means are in locked position, the anvil 24 will be located directly below the barrel hammer 6 and adjacent the upper inside wall of the barrel drum 68. Unless bearing 25 is locked by wedge 28 in recess 85, and shaft 91 is locked by wedge 94 in recess 95, the anvil will, by its own weight, swing downward from the inside wall of the barrel nearest the barrel hammer and not touch any of the inside surface of the barrel. As will be readily understood, when these locking devices are released, the anvil can swing downwardly out of the way of the crozing knives (later to be described) and to allow barrel drums 68 to rotate without friction on the inside of the barrel. Anvil 24 may be easily removed from its bearings 25, 25' to allow barrel drum 68 to be removed from the machine.

Figure 9:
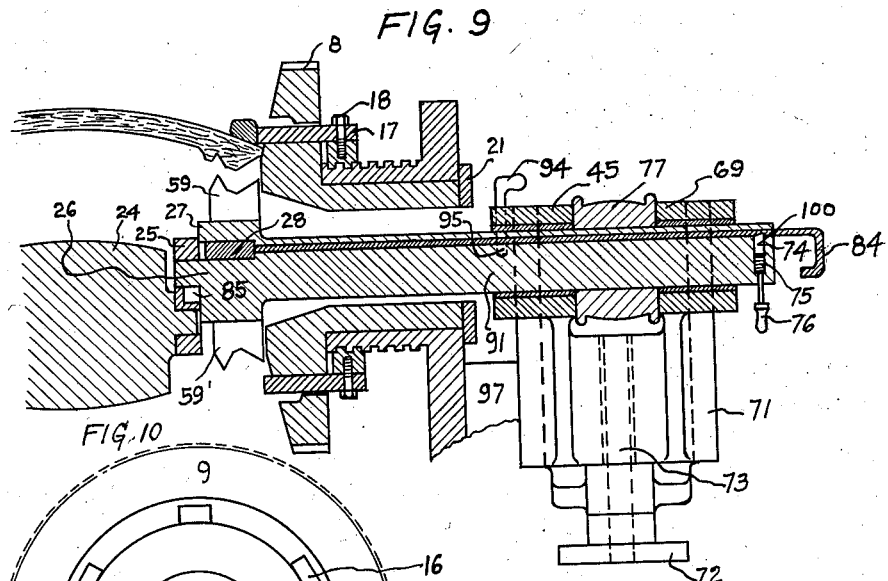
Fig. 9 is an enlarged section partially broken away taken on the same plane as Fig. 1 but with the addition of a showing of the crozing knife driving means at the right hand side of the machine.
Figure 10:
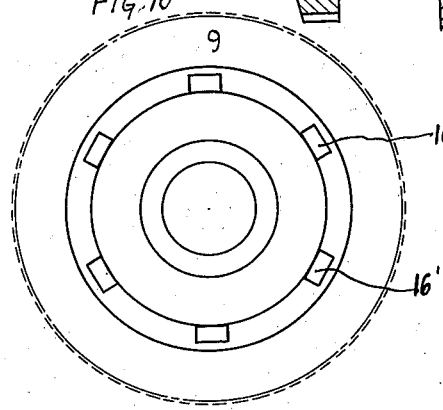
Fig. 10 is a detail end view of a bevelled face plate and showing a set of hoop driving arms.

For cutting or kerfing out the grooves in the staves for the reception of the barrel heads and also for facing off the ends of the staves, there is provided a pair of crozing attachments consisting of knives 59, 59' suitably secured as by bolts 60 (Fig. 5) to the enlarged heads 27 of the shafts 91. The construction of each shaft 91 is similar and as shown in Fig. 9 each projects outwardly beyond its bracket 20, 20' and has its projecting outer end supported in bearings 45, 69 carried by a slide 71. Between the bearings 45, 69, a pulley 77 is keyed to the shaft, and is driven by any suitable means. When shaft 91 is rotated, the knives 59 will rotate and the knives may be fed to the work by means of an elevating screw 73 having a hand wheel 72 which when turned operates slide 71, the latter being supported on a projection 97 of the adjacent bracket 20 or 20'.

For turning or planing the exterior of the drum, a wood cutting plane 67 (Fig. 2) is suitably attached by a bolt 65 and cable 66 to the face of the ram 1, the construction being such that the plane may be swung from end to end of the drum by hand while the drum is rotated.

The manner in which my machine operates is as follows:

When it has been decided upon the size barrel desired, the table brackets 20, 20' are moved either in or out, by turning hand wheel 34 and the stave bending pressure arms 5 are set in operative position. Punch press table 35 is then adjusted to the proper height by nut 38 which in turn operates elevating screw 37. Truss hoops 12, 12' are then inserted into their respective annular grooves 93, 93' in face plates 9, 9' and held therein by means of pins 13, 13' which fit into openings 15, 15' and are held against the hoops by springs 14, 14'. Truss hoops 12, 12' project slightly from the annular grooves provided therefor for a purpose later to be described.

Anvil 24 is then locked in the position shown in

Fig. 1, by means of wedge 26 and pin 84 to assist in the first stave bending operation.

Before beginning the barrel or drum making operation a sufficient supply of staves are prepared by subjecting them to a thorough steaming in accordance with the usual well known practice in this art.

The operator then takes a steamed stave and places it horizontally between the face plates 9, 9', as shown best in Fig. 1 of the drawings, and trips the punch press; as the ram 1 descends, the arms 5, 5' contact the ends of stave 7 and force said ends down onto the opposed tapered faces of the face plates, and the truss hoops, the faces of which are also tapered to substantially the same angle as the face plates. When the press reaches its lowermost position, the stave will be fully bent with the ends of the stave engaged under the protruding lower edge portions of the truss hoops 12, 12' so that when the press ascends the stave will be held securely in its bent form. The operator then turns crank 58 rotating the face plates through shaft 55, pinions 54, 54', gears 8, 8' to move the bent stave out of the path of movement of the ram 1. Another stave is then put in place and the punch press again tripped to bend such stave. This operation is continued until a complete barrel drum is formed as shown in Fig. 8 of the drawings. When enough staves to form a complete drum are in place, the operator connects the ring nuts 19, 19' to their respective face plates 9, 9' and again rotates the hand crank 58 to cause said nuts to be moved in the proper direction to bring the truss hoop driving arms into engagement with the truss hoops 12 and force the latter over the assembled bent staves. The hammering of the barrel by hammer 6 and anvil 24 is next carried out if necessary although in most cases this will not be required, then the planing and crozing operations, all as heretofore described, and by the cooperative action of the correlated parts; all of the operations being carried out without removing any of the staves from the machines, the face plates 9, 9' serving to assist in, the bending of the staves, holding and guiding the truss hoops preparatory to the driving thereof and the holding of the staves in assembled condition during the hammering, crozing, and planing operations.

While I have shown by way of illustration a construction of a machine which has proven highly satisfactory in practice, it will be understood that the invention is not limited to the specific constructional details of the machine described and illustrated but that many changes, variations and modifications may be resorted to without departing from the principles of the present invention.

I claim:

1. The combination in a barrel assembling machine having a base and frame, of an adjustable table supported by the frame, a pair of opposed inwardly facing face plates rotatably supported by said tables, a truss hoop carried by each face plate with a portion thereof projecting inwardly beyond said face plate, means for rotating said face plates, hollow shafts built integral with said face plates, threaded cylinders mounted on said hollow shafts, and threaded rings having laterally extending truss hoop driving arms secured thereto mounted on said threaded cylinders.

2. In a barrel making machine having a base and frame, means for successively bending a plurality of barrel staves comprising, a pair of opposed inwardly facing rotatably supported tapered face plates between the opposed tapered faces of which a stave to be bent is adapted to be supported, a ram mounted for movement towards and from said stave, and means carried by said ram for engaging a stave adjacent its ends to force said ends between the opposed faces of said face plates and means for rotating said face plates.

3. A barrel making machine as set forth in claim 2 in which the means for rotating said face plates comprises a pair of pinion gears one for each of said face plates and gearing associated with said face plates and in meshing engagement with said pinion gears.

4. A barrel making machine as set forth in claim 2 in which each of said face plates is provided on the inner tapered face thereof with an annular groove, a truss driving hoop adapted to be placed within said groove, said truss driving hoop having a tapered face forming a continuation of the tapered face of said face plate.

5. A barrel making machine as set forth in claim 2 in which each of said face plates is provided on the inner tapered face thereof with an annular groove, a truss driving hoop adapted to be placed within said groove, said truss driving hoop having a tapered face forming a continuation of the tapered face of said face plate, the inner edge portions of the tapered faces of said truss hoops forming a projection under which the edge of a bent stave is adapted to engage to hold said bent stave in position on said face plate during the bending of successive staves.

6. A barrel making machine as set forth in claim 2 in which each of said face plates is provided on the inner tapered face thereof with an annular groove, a truss driving hoop adapted to be placed within said groove, said truss driving hoop having a tapered face forming a continuation of the tapered face of said face plate, a plurality of truss hoop driving arms supported by said brackets for movement longitudinally of the staves supported by said face plates and means for moving said truss hoop driving arms into engagement with said truss hoops to force the latter over the ends of bent staves carried by said face plates.

7. A barrel making machine as set forth in claim 2 in which each of said face plates is provided on the inner tapered face thereof with an annular groove, a truss driving hoop adapted to be placed within said groove, said truss driving hoop having a tapered face forming a continuation of the tapered face of said face plate, a plurality of truss hoop driving arms supported by said brackets for movement longitudinally of the staves supported by said face plates and means for moving said truss hoop driving arms into engagement with said truss hoops to force the latter over the ends of bent staves carried by said face plates, said last named means comprising means for connecting said truss hoop driving arms to the means for rotating said face plates.

8. The method of bending a barrel stave which consists in supporting the ends of the stave to be bent between a pair of tapered converging surfaces, applying pressure to the outer face of said stave immediately adjacent the ends thereof to force said stave between said converging surfaces whereby the effective bending pressure applied to said stave will be exerted in a direction substantially longitudinal of said stave while leaving the intermediate portions of said stave free to bend laterally while the longitudinal pressure is exerted on the ends of said stave.

9. In a barrel making machine having a base and a frame, a pair of opposed inwardly facing tapered face plates between the opposed tapered faces in which a stave to be bent is adapted to be supported, a pair of opposed brackets in which said face plates are rotatably supported, a ram mounted for movement towards and from said stave, and means carried by said ram for engaging a stave adjacent its ends to force said ends between the opposed faces of said face plates and means for rotating said face plates.

10. In a barrel making machine having a base and frame, means for successively bending a plurality of barrel staves comprising a table supported on said frame, a pair of opposed brackets adjustably supported on said table for movement towards and from each other whereby brackets may be set for making barrels of different size and capacity, a pair of opposed inwardly facing tapered face plates rotatably supported by said brackets and between the opposed tapered faces of which a stave to be bent is adapted to be supported, a ram mounted for movements towards and from said table, and means carried by said ram for engaging a stave adjacent its ends to force said ends between the opposed faces of said face plates and means for rotating said face plates.

11. In a barrel making machine having a base and frame, means for successively bending a plurality of barrel staves comprising a table adjustably supported for vertical movement on said frame, a pair of opposed brackets adjustably supported on said table for movement towards and from each other whereby said table and brackets may be set for making barrels of different size and capacity, a pair of opposed inwardly facing tapered face plates rotatably supported by said brackets and between the opposed tapered faces of which a stave to be bent is adapted to be supported, a ram mounted for movement towards and from said table, and means carried by said ram for engaging a stave adjacent its ends to force said ends between the opposed faces of said face plates and means for rotating said face plates.

12. A barrel making machine as set forth in claim 9 in which crozing means are rotatably supported by each of said brackets and means are provided for rotating said crozing means to croze the inner end portions of the bent staves while they are held in position between said face plates.

WILLIAM RALPH ANDERSON.